Patented July 18, 1939

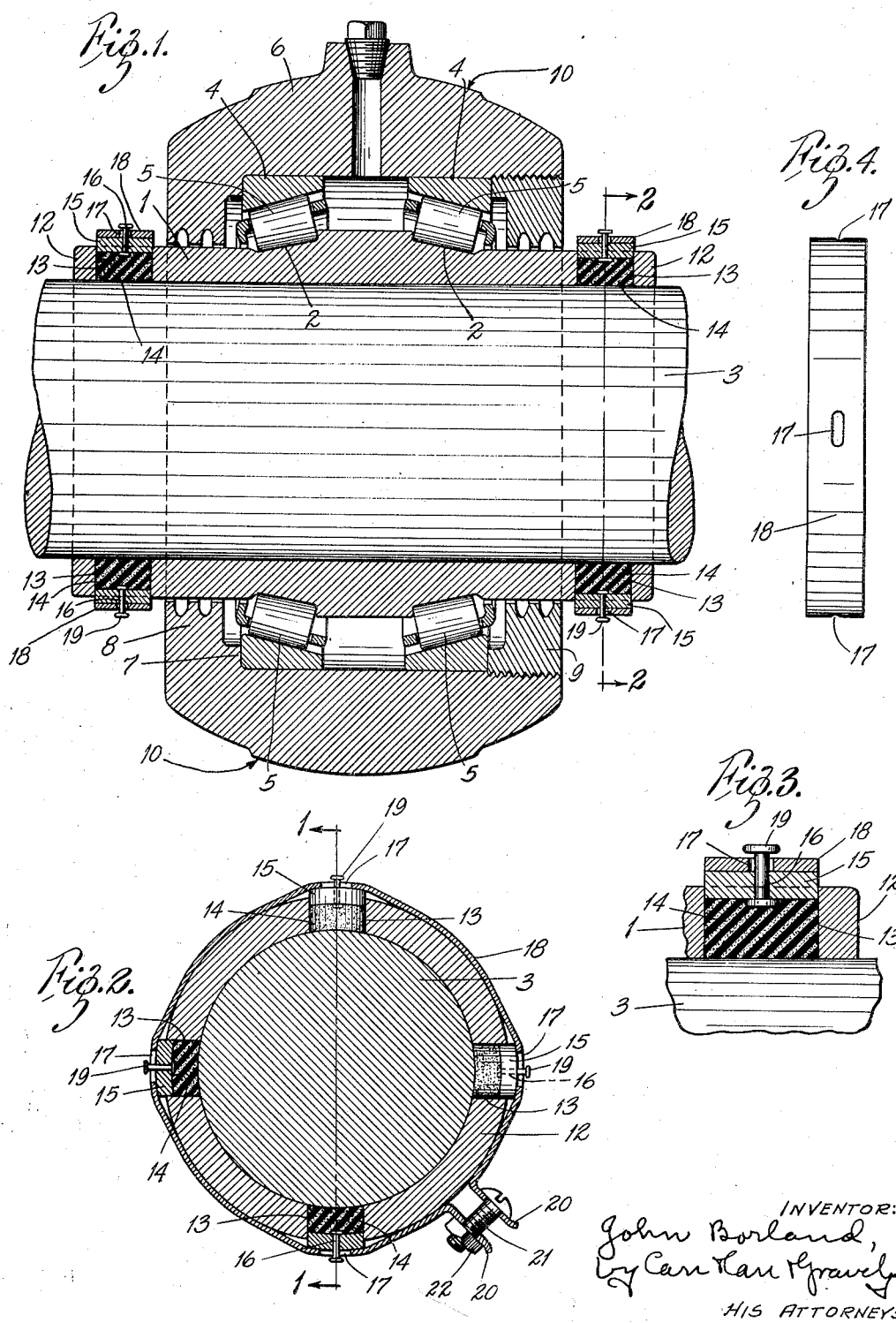

2,166,391

UNITED STATES PATENT OFFICE 2,166,391

SHAFT BEARING LOCKING MEANS

John Borland, Canton, Ohio, assignor to The Timken Roller Bearing Company, Canton, Ohio, a corporation of Ohio Application December 18, 1937, Serial No. 180,480

3 Claims. (Cl. 287—52)

My invention relates to the locking of the inner bearing members of roller bearings on shafts, particularly to the locking in position of the inner bearing members of the bearings of pillow blocks or shaft hanger constructions.

The invention has for its principal object a construction which is simple and economical, which is easily applied, which simultaneously positions clamping devices at a plurality of points around the shaft and which equalizes the pressure on all of the clamping devices. Other objects and advantages will appear hereinafter.

The invention consists principally in a plurality of clamping plugs of resilient friction material mounted in openings in the inner bearing member and held in position by means of a band encircling the several plugs, said plugs having a pin and slot connection with said band. The invention further consists in the shaft bearing locking means and in the parts and combinations and arrangements of parts hereinafter described and claimed.

In the accompanying drawing,

Fig. 1 is a longitudinal sectional view on the line 1—1 in Fig. 2 of a pillow block construction having a bearing locking means embodying my invention;

Fig. 2 is a cross-sectional view on the line 2—2 in Fig. 1;

Fig. 3 is an enlarged sectional view of one of the clamping plugs and directly associated parts; and Fig. 4 is a plan view of the band encircling the several clamping plugs.

The drawing illustrates a pillow block construction provided with taper roller bearings. The inner bearing member or cone 1 is of the integral type having two conical raceways 2 and is mounted on the shaft 3. The outer bearing members or cups 4 for the conical rollers 5 mounted on the raceways of said cone are mounted in a housing 6, one seated against an internal shoulder 7 in the housing 6 adjacent to an integral closure ring 8 at one end of the housing and the other being held in the housing 6 by means of a closure ring 9 threaded into the other end of the housing. Said housing 6 has a spherical external surface 10 which is mounted in a correspondingly spherical seat in a suitable outer housing or pedestal (not shown).

The bearing cone 1 has sleeve portions 12 at the ends, each projecting beyond an end face of the housing 6 and provided with a plurality of openings 13 at spaced points around its periphery. The drawing illustrates four such openings 13 in each sleeve portion 12 spaced apart at angles of ninety degrees. Seated in each opening 13 is a clamping plug 14 of resilient frictional material, such as rubber, synthetic rubber, brake lining, clutch facing or the like. The drawing illustrates rubber plugs 14 having vulcanized to their outer faces, metal disks 15 which project outwardly beyond the surface of the sleeve portion 12 of the bearing cone 1. Secured to said disks are rivets 16 that project through elongated slots 17 in a clamp band 18 that encircles all of the plugs 14, said slots 17 extending circumferentially. The projecting ends 19 of said rivets 16 are headed to prevent the plugs 14 from dropping out of the openings before the bearing cone 1 is applied to the shaft 3. The adjacent ends of the clamp band 18 are provided with upstanding portions 20 that have a suitable fastening means, as a bolt 21 and a nut 22, whereby the band may be drawn up as tightly as desired around the plugs 14. Obviously drawing together the ends of the clamp band 18 increases the pressure on the clamp plugs 14, the slot and pin connection between the rivets 16 and the band 18 permitting equalization of the pressure on all of the plugs 14 as well as the application of any desired pressure.

The above described construction is simple and inexpensive to make, it provides for any desired pressure and equalizes the pressure on all of the individual clamping plugs. In many instances, the clamping or locking device may be provided at one end only of the bearing. The bearing locking means is obviously applicable to other types of bearing than the taper roller bearing illustrated and to other types of mounting and numerous changes may be made without departing from the invention, so that I do not wish to be limited to the precise construction shown.

What I claim is:

1. A shaft bearing or the like comprising a shaft and a member to be secured thereon, said member mounted thereon having an extended sleeve portion provided with a plurality of openings therethrough, plugs of resilient friction material mounted in said openings, a metal cap secured to each plug, a pin extending outwardly from each cap and a securing band extending around all of said caps, said band having slots through which said pins extend.

2. A shaft bearing or the like comprising a shaft and a member to be secured thereon, said member mounted thereon having an extended sleeve portion provided with a plurality of openings therethrough, rubber plugs mounted in said openings, a metal cap vulcanized to each plug, a pin extending outwardly from each cap and a securing band extending around all of said caps, said band having circumferentially extending slots through which said pins extend.

3. A shaft bearing or the like comprising a shaft and a member to be secured thereon, said member mounted thereon having an extended sleeve portion provided with a plurality of openings therethrough, plugs of resilient friction material mounted in said openings, a metal cap secured to each plug, a headed pin extending outwardly from each cap and a securing band extending around all of said caps, said band having circumferentially extending slots through which the bodies of said pins extend.

JOHN BORLAND.